United States Patent [19]

Komai et al.

[11] 3,932,150

[45] Jan. 13, 1976

[54] VACUUM DEAERATOR

[75] Inventors: Mitsumasa Komai, Funabashi; Toshio Sawa; Kenkichi Izumi, both of Hitachi, all of Japan

[73] Assignee: Agency of Industrial Science and Technology, Tokyo, Japan

[22] Filed: Oct. 29, 1974

[21] Appl. No.: 518,616

[30] Foreign Application Priority Data
Dec. 10, 1973  Japan .................. 48-136853

[52] U.S. Cl. .................. 55/160; 55/20; 55/41; 55/194
[51] Int. Cl.² .................. B01D 19/00
[58] Field of Search .............. 55/36, 41, 43, 20, 55, 55/160, 163, 189, 190, 194

[56] References Cited
UNITED STATES PATENTS

| | | | |
|---|---|---|---|
| 1,463,158 | 7/1923 | Ehrhart | 55/39 X |
| 1,518,784 | 12/1924 | Gibson | 55/41 X |
| 2,315,481 | 3/1943 | Drewry et al. | 55/194 X |
| 3,395,510 | 8/1968 | Barnes | 55/20 |

FOREIGN PATENTS OR APPLICATIONS 561,366   5/1944   United Kingdom .............. 55/194

*Primary Examiner*—Charles N. Hart
*Assistant Examiner*—Richard W. Burks
*Attorney, Agent, or Firm*—Stewart and Kolasch, Ltd.

[57] ABSTRACT

A vacuum deaerator is provided with a plurality of low pressure chambers disposed in a multi-stage fashion. The pressures in the aforesaid low pressure chambers are so adjusted that the difference between the temperature at treated water which flows into respective low pressure chambers and the temperature in the low pressure chambers may be maintained constant.

4 Claims, 3 Drawing Figures

3,932,150

VACUUM DEAERATOR

BACKGROUND OF THE INVENTION

1. Field of the Invention

This invention relates to a vacuum deaerator for deaerating dissolved gas contained in water.

2. Description of the Prior Art

The prior art deaerators have been primarily developed for use with a condenser in a thermal power plant, while a boiled deaeration system including a heating step has been mainly adopted to this end. On the other hand, with a desalination plant of a multi-stage flash evaporation type, there have been generally adopted an external deaeration system, in which a deaerator is incorporated in a pretreatment system, including the step of decarbonation of the feed sea water introduced into a flash chamber, and a system, in which flash evaporation chambers are used as deaeration chamber. The former deaerator is of a packed column vacuum deaeration type which requires accessories such as deaerator, water delivery pump and the like, and thus is costly. On the other hand, in the adsence of stripping steam vapor, deaerated water of a low concentration may not be obtained, unless packing and like are increased in amount, so that the height of a column should be increased, thus resulting in a bulky plant. From viewpoints of operation, a high loading treatment incurs a flooding problem and the like, and thus the amount of brine to be treated should be limited to a range between 50 and 60 $m^3/m^2h$. The deaerator using the flash evaporation chambers utilizes flashing effect of feed sea water. However, it is a common practice to charge a packing, such as a tray, for obtaining deaerated water of a desired low concentration. However, this in turn poses a disadvantage in that the pressure loss due to charging of packings then lowers desired evaporation characteristics. In addition, a study has been under way to reduce the size of an evaporation chamber in a flash evaporator, by increasing the flow speed of brine. However, the reduction in size of the evaporation chamber leads to the increase in the height of a column for obtaining deaerated water of a low concentration, because liquid load on packing will be increased. In this case, difficulties are encountered when the shape of only the last stage evaporation chamber is changed, because of the arrangement of a heating pipe which has a considerable length and yet extends through 3 to 5 chambers. On the other hand, for providing temperature difference for the treated water, the number of the heat reject stage should be increased or a heater should be provided separately, resulting in the increase in cost of the apparatus. In addition, the flash temperature difference in the treated water is neutralized due to only one cycle of flashing, so that the temperature of the treated water after flashing will be equal to the temperature corresponding to a saturated vapor pressure within low pressure chambers. As a result, even if a vapor-to-liquid contacting area is widened and the dwelling time is extended, a less deaeration performance results, because of the least temperature difference between the treated water and the chambers. Thus, for obtaining deaerated water of a low concentration, the amount of packings should be increased or the load on treated water should be lessened.

It is accordingly an object of the present invention to provide a deaerator which is compact in size and deaerates brine to a lowered concentration by utilizing the flash deaerating effect of treated water according to a vacuum deaeration process.

SUMMARY OF THE INVENTION

According to the present invention, there is provided a vacuum deaerator which avoids the deaeration of treated water due to heating and the use of packing in a deaeration chamber, which deaerator is small in size and presents a high deaeration performance.

According to one aspect of the present invention, there is provided a vacuum deaerator which comprises: a plurality of low pressure chambers having nozzles for spraying treated water therein, and disposed in a multi-stage fashion; treated water supply pipes, each of which supplies the treated water present in the forward stage low pressure chamber to nozzles in the succeeding low pressure chamber; a treated water inlet pipe for supplying the treated water to nozzles in the first stage low pressure chamber; a treated water outlet pipe for discharging the treated water from the last stage low pressure chamber to the exterior thereof; a flow control valves, each of which attaches midway in the respective supply pipes and the outlet pipe; a pressure deductor for lowering the pressure in the low pressure chambers; vent lines, each of which communicates the respective low pressure chambers with the pressure deductor; vent control valves, each of which attaches midway in the respective vent lines; temperature detectors, each of which detects the difference between the temperature of the treated water flowing through nozzles into the low pressure chamber and the temperature in the same low pressure chamber; level detectors, each of which detects the level of the treated water within the respective low pressure chambers; whereby the opening of the respective vent control valves, i.e., the pressure within the respective low pressure chambers is so adjusted as to maintain constant the respective temperature difference to be detected, while the opening of the respective flow rate control valves is so adjusted as to maintain constant the level of water to be detected in the respective chambers.

According to the other embodiments of the present invention, adjustment of the aforesaid temperature difference and/or water level are contemplated to be accomplished automatically.

DESCRIPTION OF THE PREFERRED EMBODIMENTS

The present invention is directed to providing a deaerated water of a low concentration from treated water containing a high concentration of dissolved gas, by effectively utilizing the flashing effect of treated water. More specifically, there is provided a vacuum deaerator, in which the temperature of the treated water present within a plurality of low pressure chambers (deaeration chambers), during the flashing operation, is maintained at a temperature above the temperature of cooling water or use in a vacuum generator used for pressure deduction, while the treated water is provided with a flash temperature difference automatically or manually in the low pressure chambers, whereby the treated water is sequentially subjected to flashing within the low pressure chambers in the presence of the flash temperature difference.

The respective low pressure chambers contain only nozzles for flash-spraying treated water into the low pressure chamber, thus dispensing with the vapor-to-liquid contacting surfaces such as a packed tower.

Figure 1:
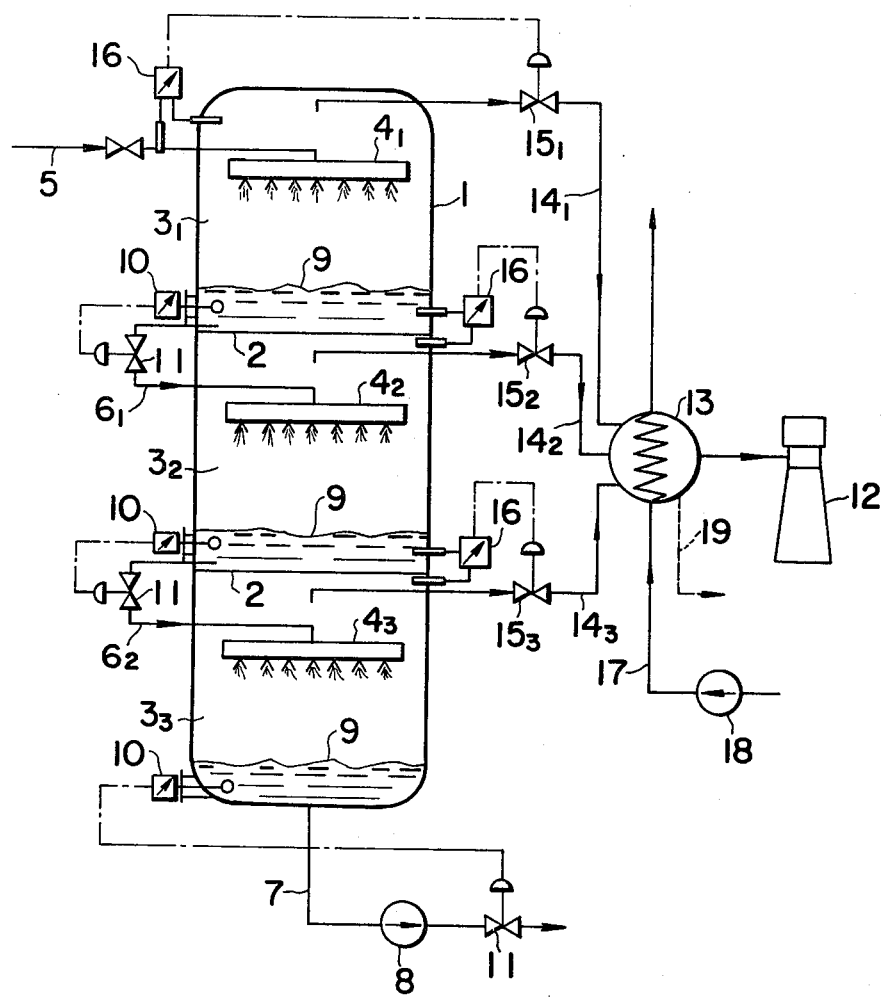
FIG. 1 is a schematic view of a vacuum deaerator according to one embodiment of the present invention.

Description will be given in more detail of one embodiment of the present invention in conjunction with FIG. 1.

A deaerator 1 consists of a tower-shaped container, with its interior partitioned into three low pressure chambers $3_1, 3_2, 3_3$ by means of partition plates 2. Provided in the upper parts of the respective low pressure chambers $3_1, 3_2, 3_3$ are nozzles $4_1, 4_2, 4_3$ for spraying the treated water into the chambers. A treated water inlet pipe 5 is connected to the nozzle $4_1$ in the first low pressure chamber $3_1$ from outside. Connected to the nozzles $4_2, 4_3$ in the second and third low pressure chambers $3_2, 3_3$ are the treated water supply pipes $6_1, 6_2$ which are open in the lower parts of the first and second low pressure chambers $3_1, 3_2$, respectively, while an outlet pipe 7 is connected to the bottom of the third low pressure chamber $3_3$ and a liquid delivery pump 8 is provided midway in the outlet pipe 7. Connected to the bottom portions of the respective low pressure chambers $3_1, 3_2, 3_3$ are level controllers 10 for controlling the levels of the treated water 9 dwelling on the bottoms of the chambers therein, whereby the flow rate adjusting valves 11 provided midway in the usupply pipes $6_1, 6_2$ and the outlet pipe 7 and the opening of the treated water pipes $6_1, 6_2$ may be adjusted to maintain constant the levels of treated water 9 in the respective low pressure chambers.

Ejector 12 and vent condenser 13 are provided for deducting the pressure in the low pressure chambers, while vent pipes $14_1, 14_2, 14_3$ are connected to the condenser 13 on one hand and are open in the upper parts of the respective low pressure chambers $3_1, 3_2, 3_3$. In addition, there is provided a temperature indicating controller 16 which is adapted to detect the difference between the temperatures of treated water introduced into the respective low pressure chambers $3_1, 3_2, 3_3$ and the temperatures in respective low pressure chambers $3_1, 3_2, 3_3$, and to adjust the openings of the vent adjusting valves $15_1, 15_2, 15_3$ attached midway in the vent pipes $14_1, 14_2, 14_3$ of a gas discharging system. Designated 17 is a cooling pipe for a condenser 13, and shown at 18 is a water delivery pump and at 19 a drain outlet pipe.

Now, description will be given of the principle of the present invention in conjunction with the accompanying drawings. The most important feature of the present invention lies in the fact that the differences between the temperatures of the treated water introduced into each of the low pressure chambers in a deaerator and the temperature within the same chambers are detected, whereby the pressures within the chambers are automatically controlled to thereby maintain the above temperature differences constant, while the treated water is deaerated in multi-stage fashion in the presence of the optimum flashing temperature difference. More particularly, the treated water is introduced through the treated water inlet pipe 5 into the deaerator 1 to be sprayed through nozzles $4_1$ in the first low pressure chamber $3_1$. In this respect, the temperature of the treated water introduced into the low pressure chamber $3_1$ as well as the temperatures in the chambers are detected at the temperature indication controller 16, while the opening of the vent adjusting valve $15_1$ attached in the vent pipe $14_1$ is manipulated so as to maintain the temperature difference constant, whereby the pressure in the low pressure chamber $3_1$ may be adjusted. The adjustment of this vent degree permits to spray the treated water in the low pressure chamber $3_1$, maintaining the flash temperature difference constant, and thus dissolved gas in the treated water may be effectively discharged due to flash deaeration effect. The treated water after flashing within the low pressure chamber $3_1$ reaches a saturated vapor pressure temperature prevailing within the low pressure chamber $3_1$. In this respect, because of a low concentration of dissolved gas being contained in the treated water, there will result lesser deaeration effect, even if the vapor-liquid contacting takes place by causing the treated water to drop within the low pressure chambers. For this reason, the distance between the lower edge of nozzles $4_1$ and the partition wall 2 within the low pressure chamber $3_1$ may be reduced, with the result of low pressure chamber of a compact size. The above-mentioned circumstances may apply to the low pressure chambers downstream. The treated water 9 which has been subjected to flash deaeration in the first low pressure chamber $3_1$ in this manner is in turn fed to the second and third low pressure chambers $3_2$ and $3_3$ having different levels of pressures, followed by the flash deaeration as in the first low pressure chamber $3_1$, to give deaerated water of a low concentration, after which the water is delivered by means of the delivery pump 8 from the third low pressure chamber $3_3$ to the exterior of the system.

Figure 2:
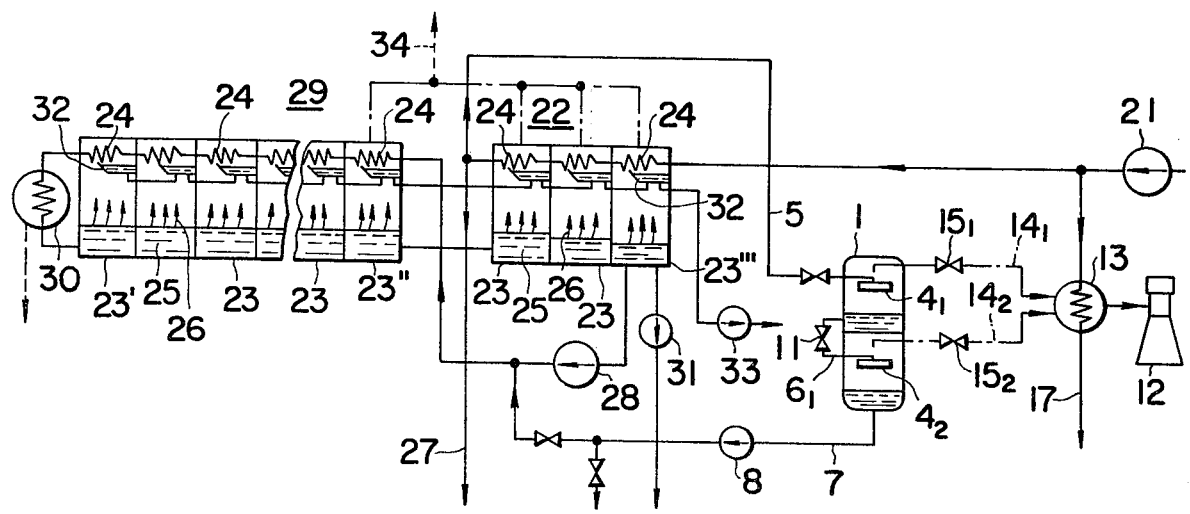
FIG. 2 is a schematic view of a desalination plant using a deaerator according to the present invention.

FIG. 2 shows an embodiment of the present invention including, in combination, a desalination plant of a multi-stage flash evaporation type.

Cooled brine is introduced by means of a brine pump 21 from the side of the last stage evaporation chamber $23'''$ into a heat reject portion of a desalination plant 22 having a plurality of evaporation chambers 23. In this respect, during the passage through a heat transmission pipe 24, the aforesaid cooled brine condenses steam 26 evaporated from the brine 25, within the evaporator 23, while receiving heat therefrom with the accompanying temperature rise, and is then introduced into the forward stage evaporation chamber 23 for heat exchange in a manner similar to the previous case, with the resultant further increased temperature rise, after which a majority of the brine thus treated is discharged by way of a pipe 27 to the exterior of the system, while the remaining part thereof is used as a supplementary brine. The supplementary brine is introduced by way of the inlet pipe 5 into the deaerator 1 of the deaeration apparatus as shown in FIG. 1, and deaerated as in the previous manner, after which the brine is mixed with a condensed brine which has been extracted by means of a brine circulation pump 28 from the last stage evaporation chamber $23'''$ of the heat reject portion 22 by way of the outlet pipe 7. The brine thus mixed is then introduced from the side of the last stage evaporation chamber $23''$ into the heat recovery stage 29 of a water producing apparatus. Then, the mixed brine heat-exchanges with steam 26 evaporated from the brine 25 during its passage through the heat-conductive pipe 24, and then heated again by means of a brine heater 30, followed by repeated evaporation in the respective evaporation chambers 23, and eventual feeding to the last stage evaporation chamber 23''' of the heat reject portion 22. Part of the brine thus condensed and reaching the last stage evaporation chamber 23''' is discharged by means of a blow-down pump 31 to the exterior of the system, while the remaining part of the brine is recirculated by a recycle pump 28 and then mixed with supplementary brine which has been deaerated, after which the brine thus mixed is fed to the heat recovery portion 29 as in the manner described earlier. Shown at 32 is a receiving container for plain water condensed by means of heat conductive pipe 24, at 33 is a delivery pump and at 34 an exhaust gas pipe for non-condensible gas.

Figure 3:
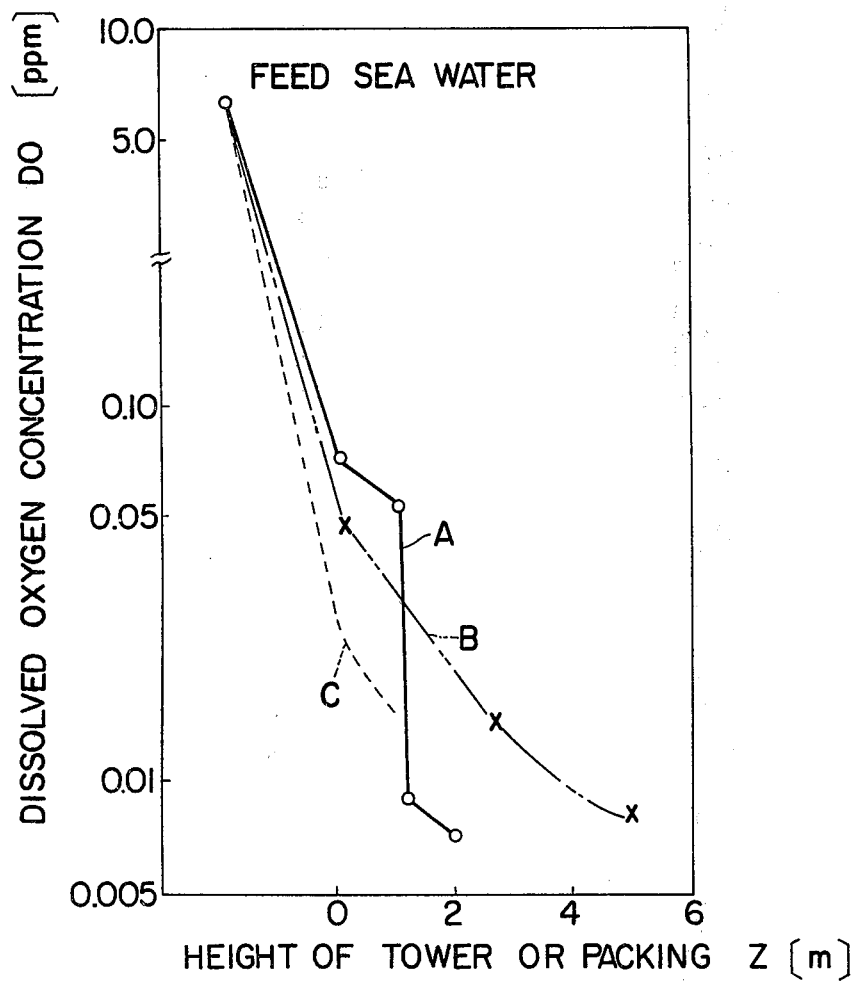
FIG. 3 is a graph representing deaeration characteristics of the two stage deaerator.

The deaerator as used in the deaeration apparatus embodying the present invention and shown in FIG. 2 has a column of a diameter of 0.45m and a height of 2m, and is divided into two chambers, while a box type multiple orifice nozzles are used. The test results obtained by using this deaeration apparatus is shown in FIG. 3 as an example. The test conditions for the deaeration apparatus of the present invention are as follows:

Flash temperature difference . . . 1.0 deg. (total 2.0 deg.)
Amount of treated water . . . 20m$^3$/h (120m$^3$/m$^2$·h)
The test results are shown by a curve A.

In contrast thereto, the test conditions for the packed tower according to the prior art are as follows:

Diameter of the tower . . . 0.8m
Height of the tower . . . 5m
Flash temperature difference . . . 1,7deg.
Amount of treated water . . . 20m$^2$/h (40m$^3$/m$^2$·h)
The test results are shown by a curve B.

In addition, the test conditions for the last stage desalination system, in which a deaerator is incorporated in the last stage flash chamber of a disalination plant of a multi-stage flash evaporation type are as follows:

Flash temperature difference . . . 2.2 deg.
Height of tray packed . . . 1m
Amount of treated water . . . 40m$^3$/h (66m$^3$/m$^2$.h)

The test results obtained by using a multi-orifice type nozzle is shown by a curve C. FIG. 3 shows that the deaeration effect due to the two stage flash system (curve A) according to the present invention is higher than those of the other packed tower system (curve B) and the last stage deaeration system (curve C), in terms of substantially the same flash temperature difference. The flash system according to the present invention permits high loading treatment and minimizes the height of the column, presenting many other excellent characteristics.

A$_s$ is apparent from the foregoing description, the deaerator according to the present invention enables the flash deaeration according to a multi-stage system, which is proved to be highly effective for deaeration, yet in the presence of a minor temperature difference. In addition, the deaerator according to the present invention presents the following advantages:

i. When compared with the packed tower deaeration system:
1. The former enables the treatment of the treated water of about three times as much as that of the treated water according to the latter system, in terms of the same tower diameter. In addition, this dispenses with the vapor-to-liquid contacting surface, thus presenting a tower height as low as 1/5 to 2/5 of that of the latter.
2. The former permits easy operation, because of the absence of flooding and the like.

ii. When compared with the last stage deaeration system:
1. The former need not provide a special heater nor a multi-stage heat discharging system for obtaining a flash temperature difference. Thus, a water producing apparatus is low in cost.
2. There is no external corrosion due to non-condensible gas nor decrease in heat conductivity. Thus, a low cost material may be used for the heat conductive pipe in the heat discharging stage.
3. The former permits consistent supply of deaerated water, regardless of temperature change in the water producing apparatus.

It should be appreciated that the present invention may provide a deaerator which is small in size and high in the deaeration effect.

When the deaerator according to the present invention is used for the disalination plant, if acid is added to the brine to be introduced into the deaerator, then the simultaneous treatment of decarbonation and deaeration within the deaerator will be possible. It is needless to mention that the provision of the flash temperature difference and the adjustment of the level of treated water within the low pressure chambers may be effected manually rather than automatically.

The deaerator according to the present invention may be used not only for a desalination plant but also for thermal power plant and chemical plant.

Various changes and modifications may be made without departing from the scope and spirit of the present invention.

What is claimed is:

1. A vacuum deaerator comprising:
a plurality of low pressure chambers having nozzles, through which is sprayed treated water therein, said chambers being disposed in a multi-stage fashion;
treated water supply pipes, each of which supplies treated water in the forward stage low pressure chamber to the nozzles in the succeeding stage low pressure chamber;
a treated water inlet pipe for supplying the treated water to nozzles in the first stage chamber;
a treated water outlet pipe for discharging treated water within the final stage low pressure chamber, to the exterior of a system;
flow rate adjusting valves, each of which attaches midway in said respective supply pipes and said outlet pipe;
a pressure reducing means for reducing the pressure in said low pressure chambers;
vent pipes, each of which communicates the respective low pressure chambers with said pressure reducing means;
vent adjusting valves, each of which attaches midway in said respective vent pipes;
temperature detecting means, each of which detects the difference between the temperature of treated water introduced by way of said nozzles into said low pressure chambers and the temperature in said low pressure chambers; and
level detecting means, each of which detects the level of treated water within said respective low pressure chambers.

2. A vacuum deaerator as set forth in claim 1, wherein said deaerator further comprises means for maintaining constant the level of treated water within the respective low pressure chambers by bringing said level detecting means in cooperative with said flow rate adjusting valve.

3. A vacuum deaerator as set forth in claim 1, wherein said deaerator further comprises: means for maintaining constant the difference between the temperature at the treated water introduced by way of nozzles into said low pressure chambers and the temperature in said low pressure chambers by bringing said temperature detecting means in cooperation with said vent adjusting valve.

4. A vacuum deaerator as set forth in claim 1, wherein said deaerator further comprises: means for maintaining constant the level of treated water within said low pressure chambers by bringing said level detecting means in cooperation with said flow rate adjusting valve; and means for maintaining constant the difference between the temperature at the treated water introduced by way of nozzles into low pressure chambers and the temperature in said low pressure chambers.

* * * * *